Oct. 20, 1936.    A. MAYER    2,057,729

INTERCELL CONNECTER FOR STORAGE BATTERIES

Filed Feb. 13, 1933

*Arthur Mayer*
INVENTOR

BY *Samuel Weisman*
ATTORNEY

Patented Oct. 20, 1936

2,057,729

UNITED STATES PATENT OFFICE 2,057,729

INTERCELL CONNECTER FOR STORAGE BATTERIES

Arthur Mayer, Detroit, Mich.

Application February 13, 1933, Serial No. 656,501

4 Claims. (Cl. 136—134)

This application is a continuation in part of my copending application, Serial No. 396,070, filed September 30, 1929.

The present invention pertains to storage batteries, and the principal object is to provide an inter-cell connecter which is substantially concealed beneath the upper surface of the cover, as distinguished from the ordinary connecters which extend over the top of the cover. Obviously, a concealed connecter results in a substantial saving of lead.

A concealed connecter must necessarily pass through or over the partition between cells, and this raises the problem of effectively preventing inter-cell leakage of liquid. The problem is aggravated by the existence of severe and continuous vibrations to which a battery is subjected on a motor car. These vibrations tend to release the connecter from the partition through or over which it passes, thereby forming cracks through which the liquid may seep from cell to cell and cause internal discharge.

The principal object of the invention is to overcome this difficulty and is accomplished by providing a resilient or yielding seal between the connecter and the partition. Such a seal does not break or crack under vibration, and it has been found that the ordinary battery sealing compound possesses sufficient yieldability to satisfy this purpose. Where the connecter crosses the partition, it is surrounded by sealing compound.

The invention is fully disclosed by way of example in the following description and in the accompanying drawing, in which—

Reference to these views will now be made by use of like characters which are employed to designate corresponding parts throughout.

Figure 2:
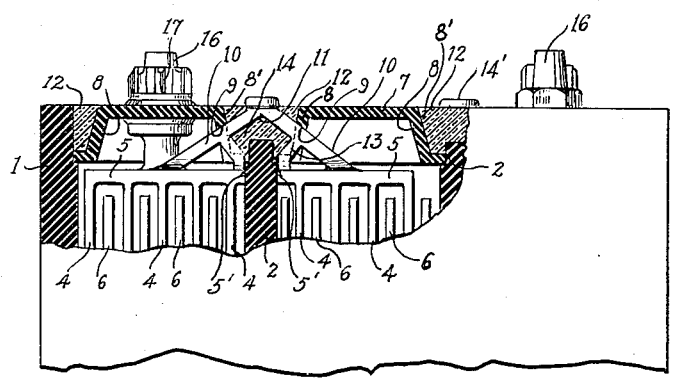
Figure 2 is a longitudinal section partly in elevation.

The battery is housed in a box or container 1 of suitable insulating material made by any of the known processes. The box is provided with partitions 2 of the same material which may be molded simultaneously with the box and which divide the interior of the box into several compartments or cells 3. The partitions are preferably not as high as the side walls of the box, as shown in Figure 2, for a purpose which will presently appear.

In each cell is a series of battery plates 4 held together by a strap 5 secured to the upper edges thereof. The straps preferably have their confronting ends 5' positioned to abut opposite faces of the intervening partition. In each cell, the plates 4 are alternated with plates 6 of opposite polarity and all the plates connected to a given strap are of like charge. The plates 4 in adjacent cells are respectively of opposite polarity as well known in battery construction.

The cover of the battery consists of sections 7, each of which is adapted to cover one cell. Each such section is formed with depending walls 8 at the longitudinal edges. These walls are so shaped that they form a groove 8' containing the upper edge of each partition 2. Both walls of each groove are slotted at 9 at opposite sides of the partition to accommodate connecters joining adjacent straps 5.

Each such connecter includes two sloping arms 10 extending from the respective straps 5 through the slots. The arms come to a point 11 over the partition, although the connecter may take other forms which nevertheless permit it to pass through the slots 9 from cell to cell.

The grooves 8' are to be filled with a sealing compound 12 as well known in the art, to prevent leakage of liquid between the partitions and the adjacent walls 8. Inasmuch as the arms 10 of the connecter do not fill the slots, the sealing compound would normally flow through the slots into the compartments. In order to prevent such an occurrence, slugs 13 are provided and are so positioned and dimensioned as to substantially close the slots 9. The fit is rather snug, but any remaining crevices are too small to permit flow of the viscous sealing compound therethrough, and hence the slots become perfectly sealed without any incidental flow of compound into the cells. Further, the ends 5' in contact with opposite faces prevent the sealing compound from flowing downwardly into the cells.

It will also be seen in Figure 2 that the height of the partition 2 is reduced sufficiently to form a substantial clearance 14 between the upper edge of the partition and the surface of the connecter. This space obviously becomes filled with sealing compound in filling the groove 8'. The sealing compound beneath the connecter forms a yieldable mounting or cushion which withstands the severe vibration of the connecter and plates in a motor vehicle without causing the connecter to break away from the adjacent parts to which it is sealed. Otherwise, the occurrence of such breaking in the absence of a resilient seal enclosing the connecter would permit seepage of liquid from cell to cell with a resulting internal discharge.

The crown or apex 11 of the connecter is preferably formed with a conductive button 14' which is exposed through the top of the sealing compound for contact with a testing instrument.

Figure 1:
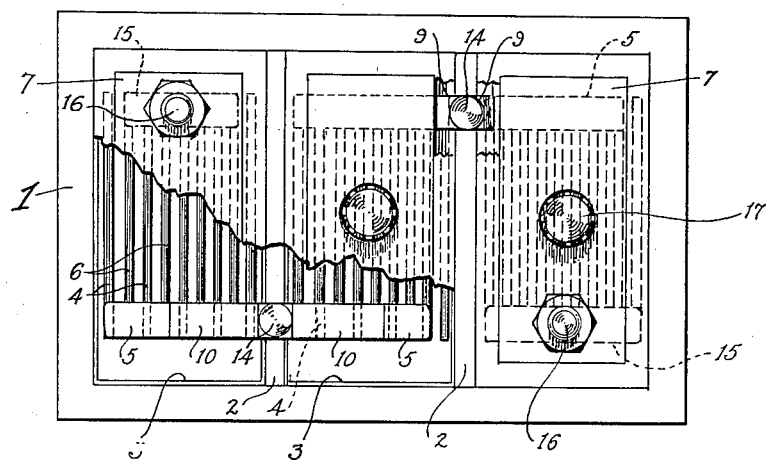
Figure 1 is a plan view of a battery constructed according to the invention, the cover being partly broken away.

As shown more clearly in Figure 1, the connection between series of plates of opposite polarity in adjacent compartments is made by the straps 5 along one side of the battery, while the similar connection between the remaining plates of the opposite charge is made at the other side. The end series which remain unconnected to any adjacent series have the top plates thereof interconnected by straps 15. These two series are oppositely charged, and binding posts 16 are extended upwardly from the straps 15 for attachment of the cables in the usual manner. Over each compartment or cell, the cover is formed with filling openings which are normally closed by plugs 17.

Figures 3, 4:
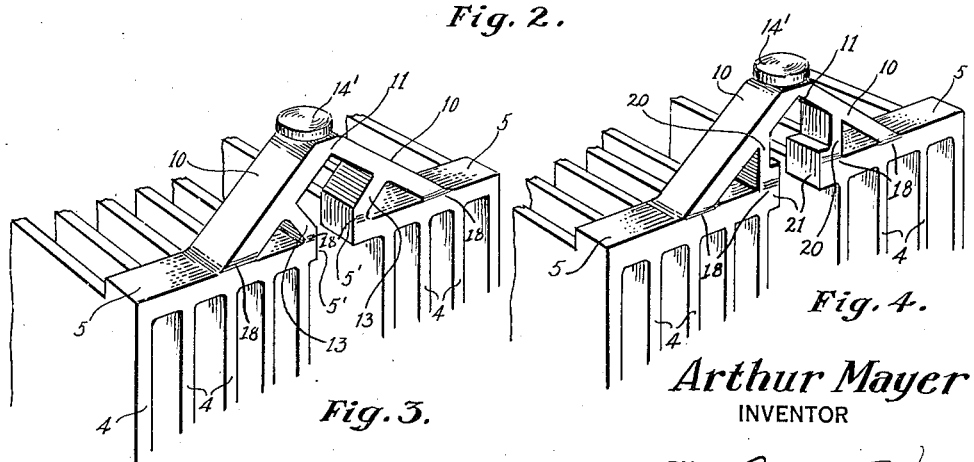
Figure 3 is a perspective view of two sets of plates joined by a connecter.
Figure 4 is a similar view of a somewhat modified construction.

In Figure 4 is shown a modified construction wherein the slugs 20 extending from the arms 10 to the straps are vertical rather than inclined as in Figure 3. At the inner ends of the slugs are formed lugs 21 which are in the nature of extensions of the straps 5 and come into engagement with opposite sides of the intervening partition.

The straps 5 may be cast integral with the plates, and the connecter formed as a separate member welded to the straps at 18, or the connecter may be cast integral with the straps and plates in one operation. In both embodiments the slugs 13 and 20 are preferably brought into engagement with the straps 5 or welded thereto whereby they serve to brace the connecter. It will be apparent that the cover 7 is not applied until the plates, straps and connecters have been assembled in the compartments.

Although specific embodiments of the invention have been illustrated and described, it will be understood that various alterations in the details of construction may be made without departing from the scope of the invention, as indicated by the appended claims.

What I claim is:

1. In a battery, a container, a partition dividing said container into compartments, a group of plates in each compartment, a strap interconnecting the plates of each group, a connecter joining said straps and passing over said partition in spaced relation laterally and vertically to the upper edge thereof, sealing compound between the partition and the connecter and on which said connecter rests, and slugs extending angularly from said connecter towards the sides of said partition to confine said compound beneath the connecter.

2. In a battery, a container, a partition dividing said container into compartments, a group of plates in each compartment, a strap interconnecting the plates of each group, a connecter joining said straps and passing over said partition in spaced relation laterally and vertically to the upper edge thereof, yielding material between the partition and the connecter and on which said connecter rests, and slugs extending angularly from said connecter towards the sides of said partition to confine said material beneath the connecter, said slugs also engaging said straps to brace the connecter.

3. In a battery, a container, a partition dividing said container into compartments, a group of plates in each compartment, a strap interconnecting the plates of each group, covers over said compartments and having downwardly extending walls engaging opposite sides of said partition and forming a groove containing the upper edge of the partition, said walls having transverse slots therethrough, a connecter joining said straps and passing through said slots and over said partition, slugs extending angularly from said connecter through said slots towards the sides of said partition and substantially closing said slots, said connecter being spaced laterally and vertically from the upper edge of said partition, and yielding material filling said groove and contained in the space enclosed by said slugs, connecter and upper edge of the partition at least to top of said slots, said space being in communication with said groove.

4. In a battery, a container, a partition dividing said container into compartments, a group of plates in each compartment, a strap interconnecting the plates of each group, covers over said compartments and having downwardly extending walls engaging opposite sides of said partition and forming a groove containing the upper edge of the partition, said walls having transverse slots therethrough a connecter joining said straps and passing through said slots and over said partition, slugs extending angularly from said connecter through said slots towards the sides of said partition and substantially closing said slots, said slugs also resting upon said straps to brace the connecter, said connecter being spaced laterally and vertically from the upper edge of said partition, and yielding material filling said groove and contained in the space enclosed by said slugs, connecter and upper edge of the partition at least to the top of said slots, said space being in communication with said groove.

ARTHUR MAYER.